US008406231B2

(12) United States Patent
Xu et al.

(10) Patent No.: US 8,406,231 B2
(45) Date of Patent: Mar. 26, 2013

(54) METHOD AND DEVICE FOR FORWARDING INFORMATION

(75) Inventors: Xiaohu Xu, Shenzhen (CN); Dayong Guo, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 231 days.

(21) Appl. No.: 12/476,669

(22) Filed: Jun. 2, 2009

(65) Prior Publication Data
US 2009/0238188 A1 Sep. 24, 2009

(30) Foreign Application Priority Data

Jul. 5, 2007 (CN) .......................... 2007 1 0029040
Jun. 24, 2008 (CN) ................. PCT/CN2008/071422

(51) Int. Cl.
*H04L 12/56* (2006.01)
(52) U.S. Cl. ........ 370/392; 370/252; 370/254; 370/401; 709/238; 709/230
(58) Field of Classification Search .................. 370/254, 370/356, 386, 392, 401, 479, 252; 726/3
See application file for complete search history.

(56) References Cited

U.S. PATENT DOCUMENTS

| | | | |
|---|---|---|---|
| 6,507,678 B2 | 1/2003 | Yahagi | |
| 6,731,642 B1 | 5/2004 | Borella et al. | |
| 7,382,787 B1 * | 6/2008 | Barnes et al. | 370/401 |
| 7,483,387 B2 * | 1/2009 | Guichard et al. | 370/252 |
| 7,571,463 B1 * | 8/2009 | Fedyk et al. | 726/3 |
| 2003/0031192 A1 | 2/2003 | Furuno | |
| 2004/0165604 A1 * | 8/2004 | Oh et al. | 370/401 |
| 2005/0010686 A1 * | 1/2005 | Nishida et al. | 709/238 |
| 2005/0105519 A1 | 5/2005 | Koppol | |
| 2007/0058568 A1 * | 3/2007 | Previdi et al. | 370/254 |
| 2008/0301312 A1 * | 12/2008 | Fernandes et al. | 709/230 |

FOREIGN PATENT DOCUMENTS

| | | |
|---|---|---|
| CN | 1610332 A | 4/2005 |
| CN | 1744574 A | 3/2006 |
| CN | 1829158 A | 9/2006 |
| EP | 0221360 A2 | 5/1987 |

OTHER PUBLICATIONS

Written Opinion of the International Searching Authority issued corresponding International Patent Application No. PCT/CN2008/071422, mailed Oct. 16, 2008.
Office Action issued in corresponding Chinese Patent Application No. 200710029040.9, mailed Dec. 24, 2010.
Communication issued in corresponding European Patent Application No. 08757831.6, mailed Jan. 20, 2011.
International Search Report issued in Corresponding PCT Application PCT/CN2008/071422; mailed Oct. 16, 2008.
Supplementary Search Report issued in corresponding European Patent Application No. 08 75 7831; issued Sep. 16, 2009.

(Continued)

*Primary Examiner* — Andrew Chriss
*Assistant Examiner* — Mohamed Kamara
(74) *Attorney, Agent, or Firm* — Brinks Hofer Gilson & Lione (57) ABSTRACT

An information forwarding method includes obtaining data information to be forwarded which carries a route indicator indicating a destination edge network, obtaining route information to a border router in the destination edge network according to the route indicator, and sending the data information to the border router in the destination edge network for forwarding. An information forwarding device is also provided.

21 Claims, 5 Drawing Sheets

OTHER PUBLICATIONS

Office Action issued in corresponding European Patent Application No. 08757831.6, mailed Apr. 10, 2012.
D. Farinacci et al., "Locator/ID Separation Protocol (LISP1)" [Routeable ID Version] Powerpoint Presentation, Oct. 2006.
D. Farinacci et al., "Locator/ID Separation Protocol (LISP2)" [DNS-based Version] Powerpoint Presentation, Nov. 2006.
Francis, "Small Routing Tables" Cornell University, Sep. 2006.

* cited by examiner

METHOD AND DEVICE FOR FORWARDING INFORMATION

CROSS-REFERENCE TO RELATED APPLICATION

This application claims priority to Chinese Patent Application No. 200710029040.9, filed on Jul. 5, 2007 titled "Method and Device for Forwarding Information", commonly assigned, incorporated in its entirety by reference herein for all purposes.

FIELD OF THE DISCLOSURE

The present disclosure relates to the field of data communication, and in particular to a method and device for forwarding information.

BACKGROUND

Routing is a behavior that delivers information from a source to a destination. A routing behavior usually includes two basic actions: determining a best route and delivering data. Metric is a measurement used by a routing algorithm to determine the best route to the destination, such as bandwidth or path cost. To help select the route, the routing algorithm initializes and maintains a routing table that includes routing information, where routing information varies with the routing algorithm in use. When the router receives a packet, the router checks the destination address and attempts to connect the address with its next hop. A routing table includes multiple types of information including distance information, hop count information and information of the next hop address. Metrics vary with the routing algorithm in use. The routing table compares the metrics to determine the best route. A router communicates with other routers to maintain its routing table by exchanging routing information. Routing update information usually concerns all or part of the routing tables. The router builds a network topology map by analyzing routing update information from other routers. Another example of information exchange between routers is the exchange of link state advertisements. A router notifies its link-state information to other routers by sending an advertisement. The link state information is used for building a complete topology map so that the router can determine the best route.

Multi-homing is a technique to increase the reliability of the Internet connection, which means that a user connects to the Internet by more than one link. In fact, Traffic Engineering (TE) is a set of tools and methods, which can get the best service from given infrastructure no matter whether a network device or a transport line works normally or fails. This requires optimization of the used resources. With the wide deployment of multi-homing and TE systems, Internet routes increase rapidly. As a result, on the one hand, because larger capacity chips are needed to store larger routing tables, the cost of routers is growing; on the other hand, route convergence becomes slower, which hinders system response and affects efficiency of the entire system.

Because a routing table in the prior art includes specific routes to target subnets, when Internet routes increase rapidly, corresponding routing information must be added in routers in the Transit Network (TN) and the Edge Network (EN), so that the size of a routing table also increases rapidly. As a result, the cost for devices to store routing tables rises and route convergence becomes slower. The efficiency of the entire system is therefore low.

SUMMARY

A method for forwarding information includes obtaining data information that carries a route indicator indicating a destination edge network obtaining route information to the border router in the destination edge network according to the route indicator, and sending the data information to the border router in the destination edge network for processing.

A device for forwarding information includes a receiving unit, configured to obtain data information that carries a route indicator indicating a destination edge network, an obtaining unit, configured to obtain route information to the border router in the destination edge network corresponding to the route indicator according to the route indicator, and a sending unit, configured to send the data information to the border router in the destination edge network for processing.

The information forwarding method obtains data information to be forwarded which carries a route indicator indicating a destination edge network, obtains border router information in the destination edge network according to the route indicator, and sends the data information to the border router in the destination edge network for further forwarding. In this way, only a Registration Agent (RA) in a TN needs to maintain all routing information (including routing information in the EN) on the Internet while other routers in the TN only need to maintain routing information in the TN. A host in the EN that data information is destined for can be obtained by querying the RA, or the data information can be forwarded to the destination host by the RA.

DETAILED DESCRIPTION OF THE DISCLOSURE

Embodiments of the disclosure provide an information forwarding method and an information forwarding device. When Internet routes increase rapidly, a router in a TN only needs to find a border router in a corresponding EN according to a route indicator so as to forward information in the TN, without the need to add routing table entries in the TN in accordance with the EN routing table entries. Thereby, the cost of routing table storage devices in the entire network is reduced, the route convergence is quicker in the entire network, and the work efficiency of the entire network is higher.

The embodiments of the present disclosure are hereinafter described in detail with reference to the accompanying drawings.

Figure 1:
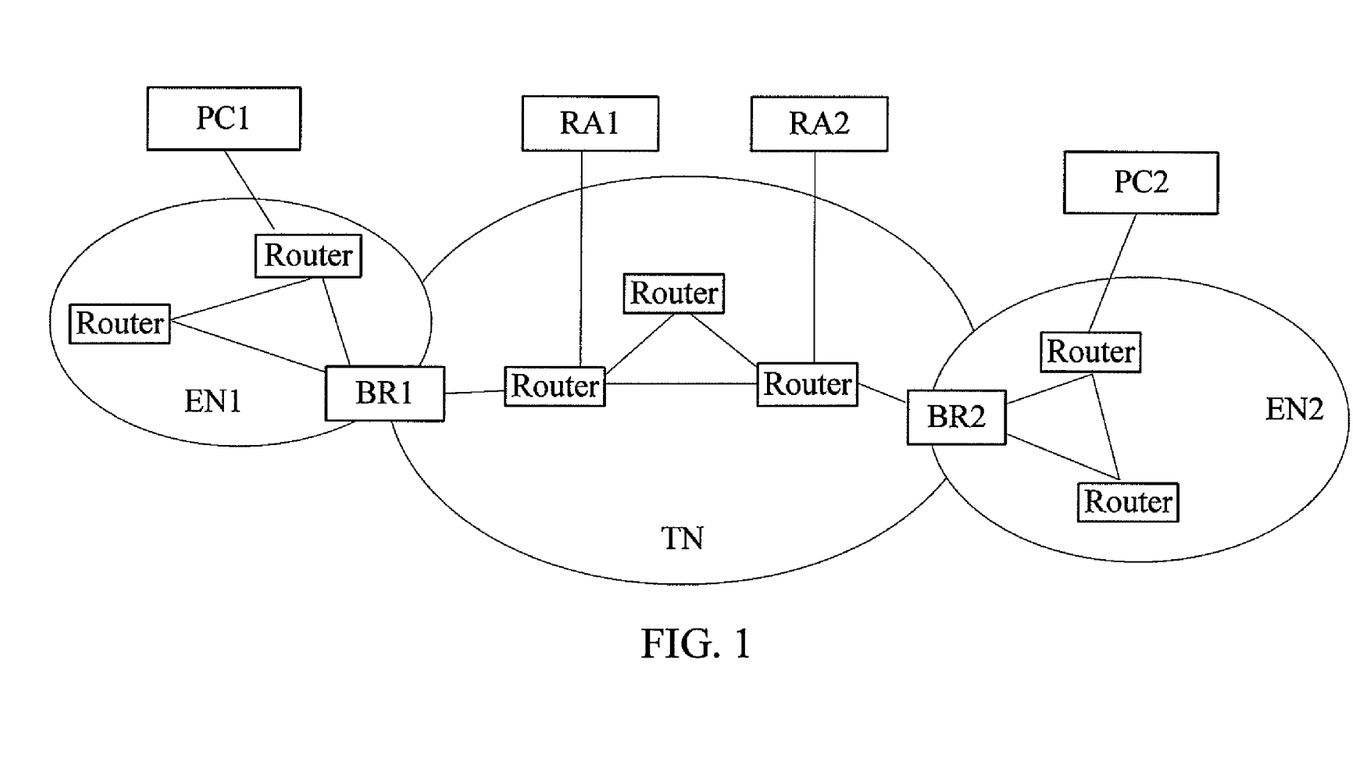
FIG. 1 shows a network structure of the Internet in a prior art.
Figure 2:
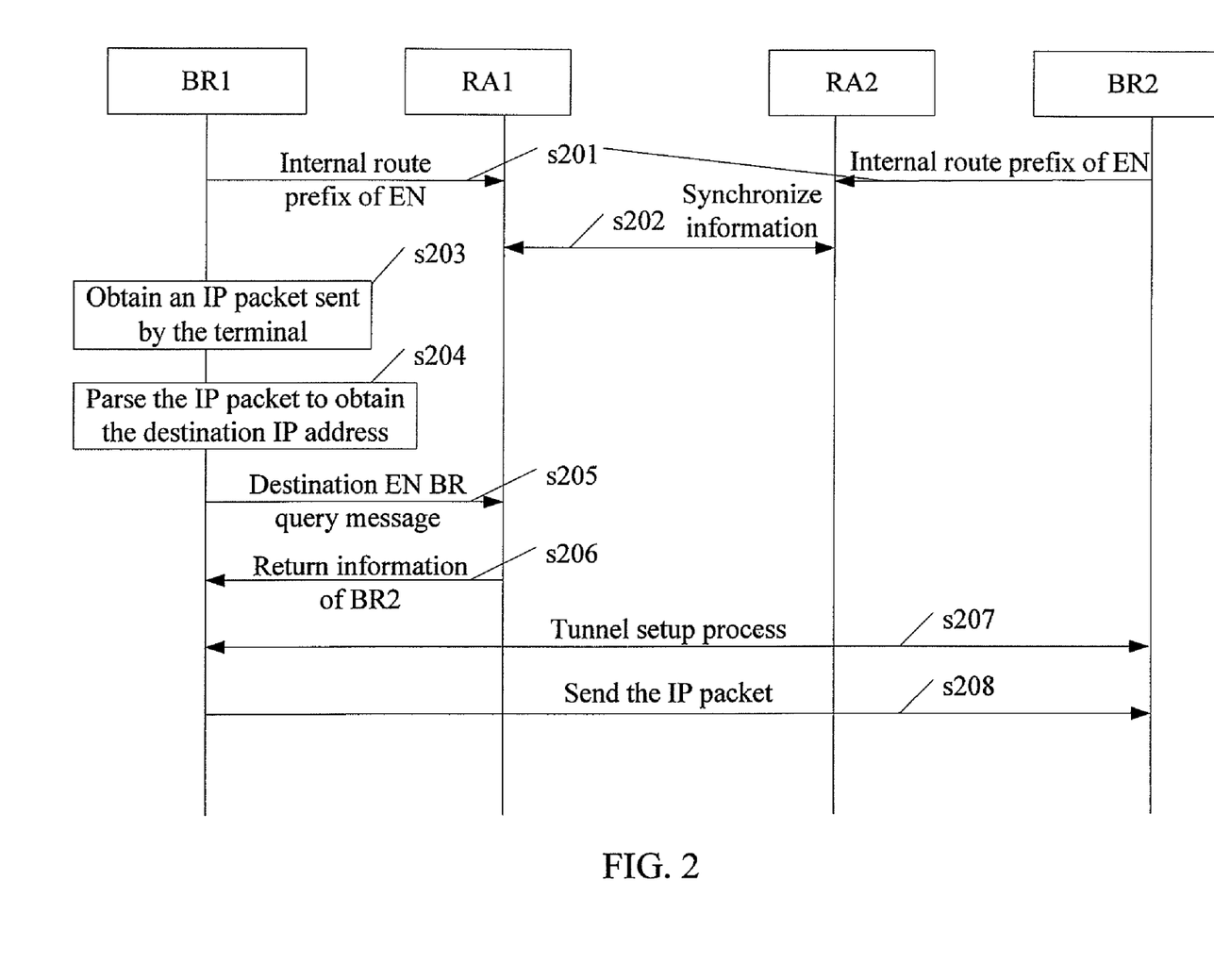
FIG. 2 shows an information forwarding method according to a first embodiment of the disclosure.

FIG. 2 shows an information forwarding method according to a first embodiment of the disclosure. The method is based on the Internet structure in a prior art shown in FIG. 1. The Internet includes EN1, EN2 and a TN, where an EN includes Personal Computers (PCs) and Border Routers (BRs) and the TN includes Registration Agents (RAs) besides the BRs shared with the ENs. The EN and TN also include other routing devices. The method is described in detail as follows.

As shown in FIG. 2, the information forwarding method includes the following steps:

s201. A BR registers internal prefix information of a connected EN in the proximate RA. For example, BR1 registers an internal prefix (such as 20.1.1.0/24) of EN1 in the proximate RA1 and BR2 registers an internal prefix (such as 10.1.1.0/24) in the proximate RA2 to create a mapping table between the prefix and the BR that registers the prefix. BR1 is mapped to 20.1.1.0/24 and BR2 is mapped to 10.1.1.0/24. The proximate RA is associated via the Anycast mechanism.

s202. The mapping tables of RA1 and RA2 in the TN are synchronized. Specifically, RA1 and RA2 notify each other of the respectively received mapping information via a protocol. For example, the Border Gateway Protocol (BGP) is adopted to synchronize the mapping tables. A full-meshed BGP connection may be established between RA1 and RA2 or a Router Reflector (RR) may be adopted to implement the connection, or an independent protocol may be defined to realize the above synchronization purpose.

After the registration process in s201 and the synchronization process in s202, the following information forwarding process continues:

s203. BR1 obtains an IP packet sent by PC1 in EN1, where the IP packet is forwarded in EN1 to BR1 of EN1 hop by hop according to the routing method in the prior art.

s204. BR1 parses the obtained IP packet to get the destination IP address in the IP packet, for example, 10.1.1.2.

s205. Via a tunnel destined for an RA Anycast address, BR1 sends a BR query message that carries the destination address to RA1 and waits for RA1 to provide BR information of the destination EN corresponding to the destination IP address.

s206. RA1 queries the synchronized mapping table to obtain the BR information of the destination EN corresponding to the destination IP address carried in the BR query message and returns the BR information to BR1. For example, when the registered prefix with the longest match with 10.1.1.2 is 10.1.1.0/24 and the BR corresponding to the prefix is BR2, RA1 returns the BR2 information to BR1.

s207. A communication tunnel is set up between BR1 and BR2. The communication tunnel may be a Multi-Protocol Label Switching (MPLS) tunnel or an IPinIP tunnel, or a Generic Routing Encapsulation (GRE) tunnel.

s208. BR1 sends the IP packet to BR2 via the tunnel established in s207 and BR2 forwards the IP packet to the destination terminal.

Figure 3:
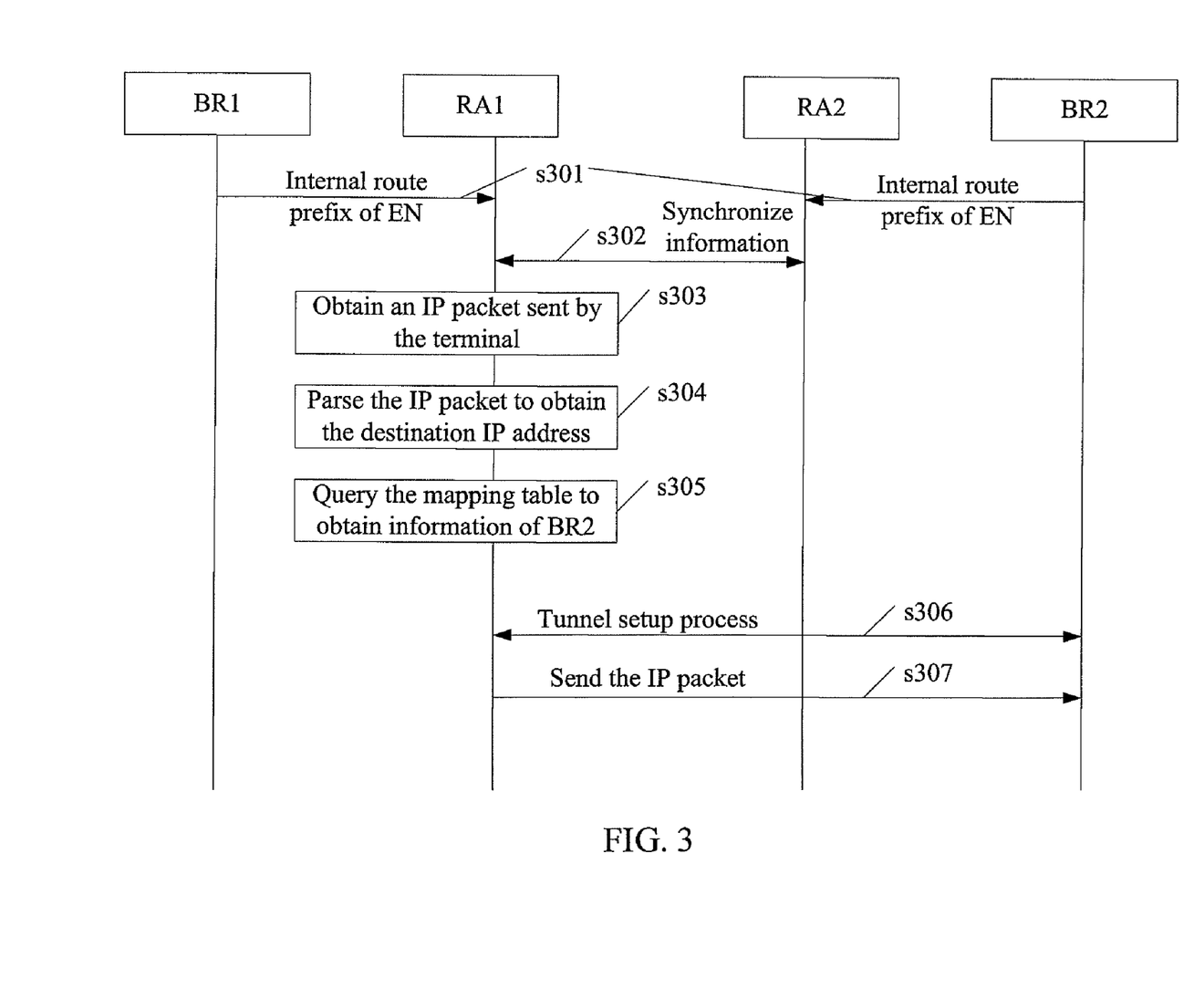
FIG. 3 shows an information forwarding method according to a second embodiment of the disclosure.

FIG. 3 shows an information forwarding method according to a second embodiment of the disclosure. The method is also based on the Internet structure shown in FIG. 1. The information forwarding method includes:

s301. A BR registers internal prefix information of a connected EN in the proximate RA. For example, BR1 registers an internal prefix (such as 20.1.1.0/24) of EN1 in the proximate RA1 and BR2 registers an internal prefix (such as 10.1.1.0/24) in the proximate RA2 to create a mapping table between the prefix and the BR that registers the prefix. BR1 is mapped to 20.1.1.0/24 and BR2 is mapped to 10.1.1.0/24. The proximate RA is associated via the Anycast mechanism.

s302. The mapping tables of RA1 and RA2 in the TN are synchronized. Specifically, RA1 and RA2 notify each other of the respectively received mapping information via a protocol. For example, the Border Gateway Protocol (BGP) is adopted to synchronize the mapping tables. A full-meshed BGP connection may be established between RA1 and RA2 or a Router Reflector (RR) may be adopted to implement the connection, or an independent protocol may be defined to realize the above synchronization purpose.

After the registration process in s301 and the synchronization process in s302, the following information forwarding process continues:

s303. RA1 obtains an IP packet sent by PC1 in EN1. The IP packet is forwarded to BR1 in EN1 hop by hop according to the routing method in the prior art. When BR1 receives the IP packet, BR1 sends the packet to RA1 via a tunnel destined for the RA Anycast address.

s304. RA1 parses the obtained IP packet to get the destination IP address in the IP packet, for example, 10.1.1.2.

s305. RA1 queries the synchronized mapping table to get the BR information mapped to the prefix with the longest match with the destination IP address. For example, the registered prefix with the longest match with 10.1.1.2 is 10.1.1.0/24 and the BR corresponding to the prefix is BR2.

s306. A communication tunnel is set up between RA1 and RA2. The communication tunnel may be an MPLS tunnel, or an IPinIP tunnel, or a GRE tunnel.

s307. RA1 sends the IP packet to BR2 via the tunnel established in s306 and BR2 forwards the IP packet to the destination terminal.

In addition, based on the Internet structure shown in FIG. 1, an information forwarding method in another embodiment of the disclosure may be as follows:

Indicator information indicating BR2 in the destination EN2 is adopted and carried in an IP packet sent by PC1 in EN1. When BR1 receives the IP packet, BR1 can extract the indicator information in the IP packet and set up a communication tunnel between BR1 and BR2 according to BR2 indicated by the indicator. Later, BR1 forwards the IP packet to BR2 via the communication tunnel.

Accordingly, the following describes an information forwarding device provided in embodiments of the disclosure.

Figure 4:
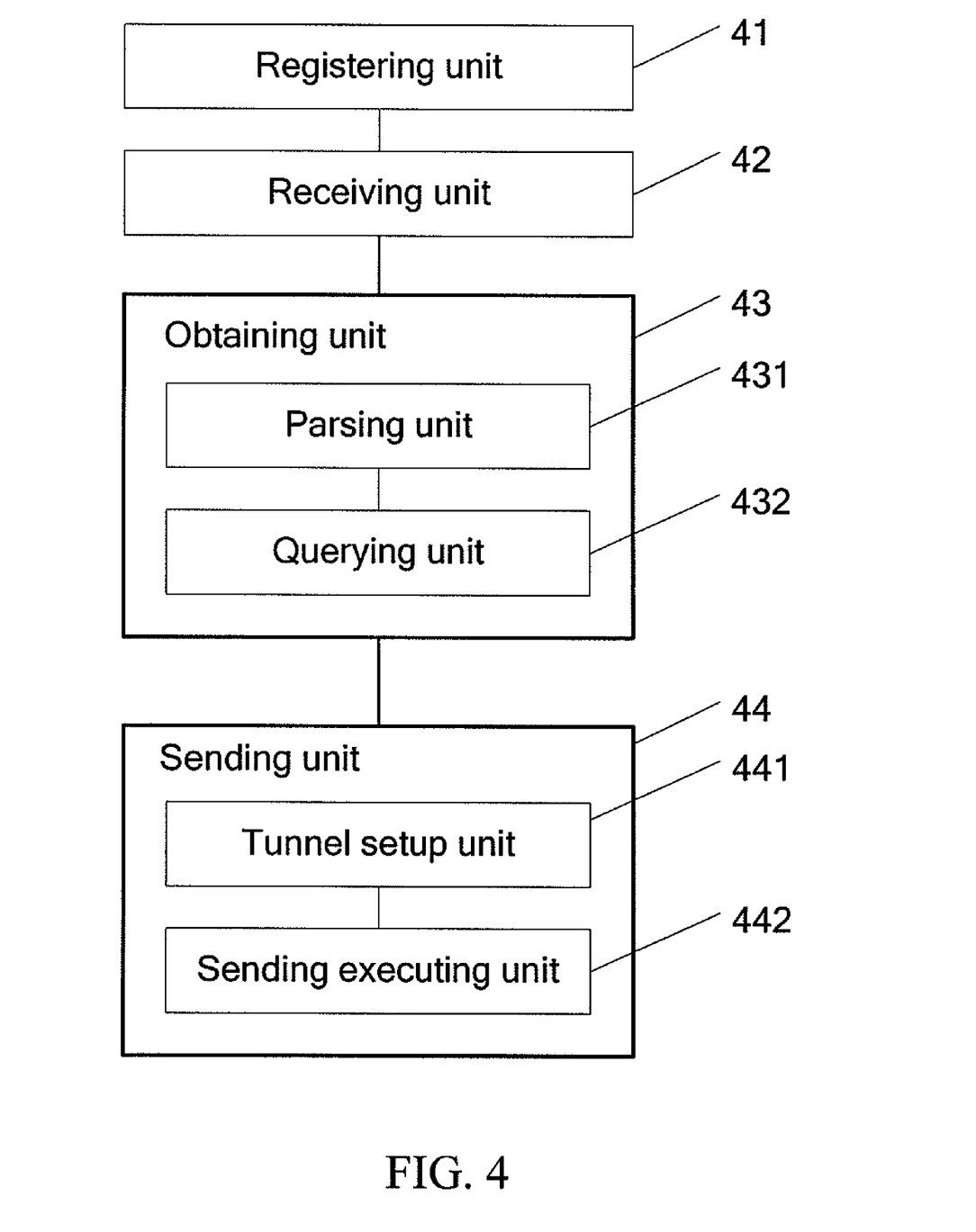
FIG. 4 shows an information forwarding device according to a first embodiment of the disclosure.

FIG. 4 shows an information forwarding device provided according to an embodiment of the disclosure. Specifically, the information forwarding device is a BR which includes: a registering unit 41, a receiving unit 42, an obtaining unit 43 and a sending unit 44. The obtaining unit 43 includes a parsing unit 431 and a querying unit 432. The sending unit 44 includes a tunnel setup unit 441 and a sending executing unit 442. The connection between the units and their functions are described as follows:

The registering unit 41 is connected to the receiving unit 42. The receiving unit 42 and the sending unit 44 are connected to the obtaining unit 43, respectively. The parsing unit 431 is connected to the querying unit 432. The tunnel setup unit 441 is connected to the sending executing unit 442.

The registering unit 41 sends registration information to a proximate RA in the TN connected with the BR. The registration information is internal prefix information of the EN. For example, when the BR wants to register an internal prefix (20.1.1.0/24) of the EN in the proximate RA, the registering unit 41 sends registration information that carries the prefix 20.1.1.0/24 to the RA and instructs the RA to create a mapping table between the prefix 20.1.1.0/24 and the BR that registers the prefix so that the BR and 20.1.1.0/24 are mapped. The proximate RA is associated via the Anycast mechanism. It should be understood that the mapping tables registered on all RAs are synchronized via a protocol, such as BGP. A full-meshed BGP connection is established, or a connection is established via an RR, or an independent protocol may be defined to realize the synchronization of mapping tables.

The receiving unit 42 receives an IP packet sent by a PC in the EN after the registering unit 41 completes the registration.

The parsing unit 431 parses the IP packet received by the receiving unit 42 to obtain the destination IP address in the IP packet, for example, 10.1.1.2.

The querying unit 432 sends a BR query message that carries the destination IP address to the RA that stores the registered and synchronized mapping table and obtains the required BR information in the destination EN. The RA may look up the BR information in the destination EN mapped to the prefix by obtaining a registered prefix with the longest match with the destination IP address.

The tunnel setup unit 441 sets up a communication tunnel between the BR and the BR in the destination EN. The communication tunnel may be an MPLS tunnel, or an IPinIP tunnel, or a GRE tunnel.

The sending executing unit 442 sends the IP packet to the BR in the destination EN via the tunnel established by the tunnel setup unit 441 and the BR in the destination EN forwards the packet to the destination terminal.

Figure 5:
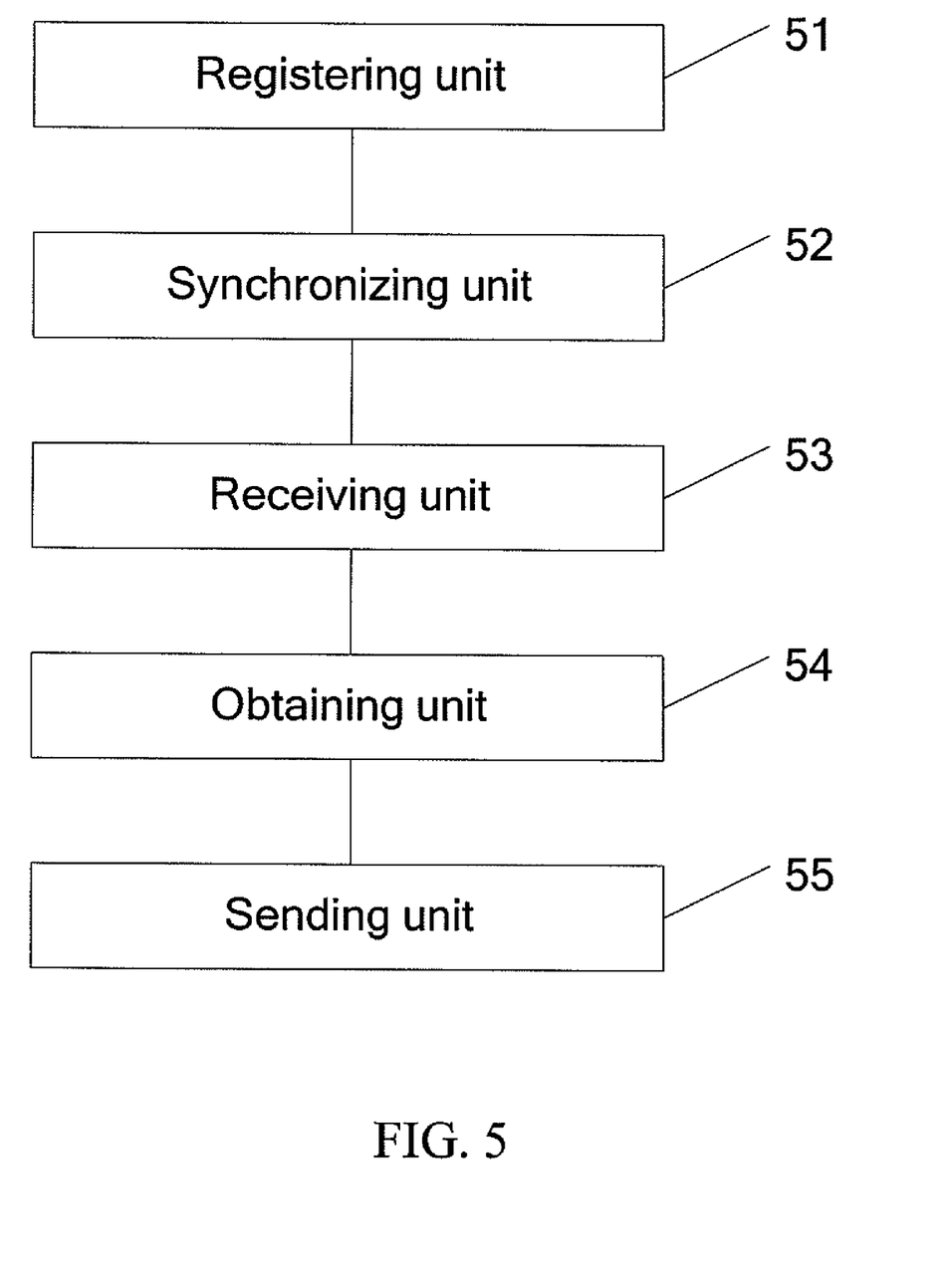
FIG. 5 shows an information forwarding device according to a second embodiment of the disclosure.

FIG. 5 shows an information forwarding device provided according to another embodiment of the disclosure. The information forwarding device is specifically an RA which includes a registering unit 51, a synchronizing unit 52, a receiving unit 53, an obtaining unit 54 and a sending unit 55. The connections between the units and their functions are as follows:

The registering unit 51 is connected to the synchronizing unit 52. The synchronizing unit 52 is connected to the receiving unit 53. The receiving unit 53 and the sending unit 55 are connected to the obtaining unit 54 respectively.

The registering unit 41 creates a mapping table between a prefix and the BR that registers the prefix according to registration information carrying the prefix sent by the BR. For example, when the BR registers the internal prefix (20.1.1.0/24) of the EN in the proximate RA, the registering unit 41 creates a mapping between the prefix 20.1.1.0/24 and the BR that registers the prefix after receiving the registration information that carries the prefix 20.1.1.0/24 so that the BR and 20.1.1.0/24 are mapped. The proximate RA is associated via the Anycast mechanism.

The synchronizing unit 52 synchronizes the mapping information registered in all RAs via a protocol. Specifically, the synchronizing unit 52 may set up a full-meshed BGP connection, or establish a connection via an RR, or adopt an independently defined protocol to realize the synchronization.

After the registering unit 51 and the synchronizing unit 52 complete their respective processing, the receiving unit 53 receives an IP packet sent by a PC in the EN. In the EN of the PC, the IP packet is forwarded to the BR in the EN hop by hop according to the routing method in the prior art. Upon reception of the IP packet, the BR sends the IP packet to the receiving unit 53 via a tunnel between the BR and the RA.

The obtaining unit 54 parses the received IP packet to obtain the destination IP address of the IP packet. For example, when the destination IP address of the IP packet is 10.1.1.2, the prefix with the longest match with the destination IP address is 10.1.1.0/24. The obtaining unit 54 also queries the mapping table synchronized by the synchronizing unit 52 to obtain BR information of the destination EN mapped to the prefix.

The sending unit 55 sets up a communication tunnel between the RA and the BR in the destination EN. The communication tunnel may be an MPLS tunnel, or an IPinIP tunnel, or a GRE tunnel. The sending unit 55 also sends the IP packet to the BR in the destination EN via the communication tunnel and the BR in the destination EN forwards the IP packet to the destination terminal.

It should be understood that the Anycast mechanism for associating the proximate RA with a BR is Anycast Rendezvous Point (RP) defined both in Internet Protocol version 6 (IPv6) and Protocol Independent Multicast-Sparse Mode (PIM-SM). Specifically, all RAs use one IP address when providing the mapping query and information forwarding service. Thereby, mapping registration and information query messages sent by the BR to an RA are destined for this IP address. When an RA needs to provide the information forwarding service, the tunnel between the BR and the RA uses this IP address. Besides, according to the principle of shortest path forwarding, the registration message and query message and information to be forwarded by the RA will all be routed to the proximate RA. However, when the mapping tables are synchronized between RAs, each RA uses a different IP address.

With the embodiments of the disclosure, when Internet routes increase rapidly, only the RA in a TN needs to maintain all routing information (including routing information in the EN) on the Internet while other routers in the TN only need to maintain routing information in the TN. A host in the EN for which data information is destined can be obtained by querying the RA or the data information can be forwarded to the destination host by the RA. This can cut the cost of routing table storage devices in the entire network, increase the speed of route convergence in the network and improve the efficiency of the entire system.

Although the disclosure has been described through exemplary embodiments, the disclosure is not limited to such embodiments. It is apparent that those skilled in the art can make various modifications and variations to the disclosure without departing from the spirit and scope of the disclosure. The disclosure is intended to cover the modifications and variations provided that they fall in the scope of protection defined by the claims or their equivalents.

What is claimed is:

1. A method for forwarding information, in a system comprising an edge network (EN) and a transit network (TN), wherein the transit network (TN) includes a first registration agent (RA); the method comprising:
   obtaining, by a first border router (BR), an IP packet that carries an IP address indicating a destination edge network; where the first BR is in the EN and the TN;
   obtaining, by the first BR, from the first RA, BR information of a second BR in the destination edge network corresponding to the IP address; and
   sending, by the first BR, the obtained IP packet to the second BR in the destination edge network for processing;
   wherein the first RA maintains all routing information on the edge network and the TN while other routers in the TN only maintain routing information in the TN.

2. The method of claim 1, wherein obtaining, by the first BR, from the first RA, BR information of the second BR in the destination edge network corresponding to the obtained IP address, comprises:
   parsing the obtained IP packet to obtain a destination IP address of the obtained IP packet; and
   obtaining border router information of the second BR in the destination edge network corresponding to edge network route prefix information with the longest match with the destination IP address by querying a mapping table between edge network route prefix information and border router information.

3. The method of claim 2, wherein before obtaining, by a first BR, the IP packet that carries the IP address indicating the destination edge network, the method further comprises:
   registering a mapping table between edge network route prefix information and border router information.

4. The method of claim 3, wherein after registering the mapping table between edge network route prefix information and border router information, the method further comprises:
synchronizing the registered mapping tables of the first RA and a second RA.

5. The method of claim 4, wherein sending, by the first BR, the obtained IP packet to the second BR in the destination edge network for processing comprises:
setting up a tunnel from the first BR to the second BR in the destination edge network; and
sending the obtained IP packet to the second BR in the destination edge network for processing via the tunnel.

6. The method of claim 5, wherein the tunnel is a Multi-Protocol Label Switching (MPLS) tunnel, an IPinIP tunnel, or a Generic Routing Encapsulation (GRE) tunnel.

7. A device for forwarding information, in a system comprising an edge network (EN) and a transit network (TN), wherein the TN includes at least one registration agent (RA); the device comprising:
a receiving unit in a first border router (BR), configured to obtain an IP packet that carries an IP address indicating a destination edge network; where the first BR is in the EN and the TN;
an obtaining unit in the first BR, configured to obtain BR information of a second BR in the destination edge network corresponding to the IP address, from a first RA of the at least one RA; and
a sending unit in the first BR, configured to send the obtained IP packet to the second BR in the destination edge network for processing;
wherein the RA maintains all routing information on the edge network and the TN while other routers in the TN only maintain routing information in the TN.

8. The device of claim 7 wherein the obtained IP address is a destination IP address and the obtaining unit comprises:
a parsing unit, configured to parse the obtained IP address to obtain the destination IP address of the obtained IP packet; and
a querying unit, configured to obtain border router information of the second BR in the destination edge network corresponding to edge network route prefix information with the longest match with the destination IP address by querying a mapping table between edge network route prefix information and border router information.

9. The device of claim 8, further comprising:
a registering unit, configured to register the mapping table between edge network route prefix information and border router information.

10. The device of claim 9, further comprising:
a synchronizing unit, configured to synchronize the registered mapping tables of a first RA and a second RA.

11. The device of claim 10, wherein the sending unit comprises:
a tunnel setup unit, configured to set up a tunnel from the first BR to the second BR in the destination edge network; and
a sending executing unit, configured to send the obtained IP packet to the second BR in the destination edge network for processing via the tunnel.

12. A method for forwarding information, in a system comprising an edge network and a transit network, wherein the transit network includes a first registration agent (RA); the method comprising:
obtaining, by the first RA, an IP packet that carries an IP address indicating a destination edge network;
obtaining, by the first RA, border router information of a border router(BR) in the destination edge network corresponding to the obtained IP address; and
sending, by the first RA, the obtained IP packet to the BR in the destination edge network for processing;
wherein the first RA maintains all routing information on the edge network and the TN while other routers in the TN only maintain routing information in the TN.

13. The method of claim 12, wherein obtaining, by the first RA, border router information of the BR in the destination edge network corresponding to the obtained IP address, comprises:
parsing the obtained IP packet to obtain a destination IP address of the obtained IP packet; and
obtaining, by the first RA, border router information of the BR in the destination edge network corresponding to edge network route prefix information in longest match with the destination IP address by querying a mapping table between edge network route prefix information and border router information.

14. The method of claim 13, wherein before obtaining, by the first RA, the IP packet that carries the IP address indicating the destination edge network, the method further comprises:
registering a mapping table between edge network route prefix information and border router information.

15. The method of claim 14, wherein after registering the mapping table between edge network route prefix information and border router information, the method further comprises:
synchronizing the registered mapping tables of the first RA and a second RA.

16. The method of claim 12, wherein sending the obtained IP packet to the border router in the destination edge network for processing comprises:
setting up, by the first RA, a tunnel from the first RA to the BR in the destination edge network; and
sending by the first RA, the obtained IP packet to the BR in the destination edge network for processing via the tunnel.

17. The method of claim 16, wherein the tunnel is one of a Multi-Protocol Label Switching (MPLS) tunnel, an IPinIP tunnel, and a Generic Routing Encapsulation (GRE) tunnel.

18. The method of claim 1, wherein the first RA maintains all routing information on the edge network and the TN while other routers in the TN only maintain routing information in the TN.

19. A device for forwarding information, in a system comprising an edge network and a transit network, wherein the transit network includes a first registration agent, RA; the device comprising:
a receiving unit in the first RA, configured to obtain an IP packet that carries an IP address indicating a destination edge network;
an obtaining unit in the first RA, configured to obtain border router information of the border router (BR) in the destination edge network corresponding to the IP address; and
a sending unit in the first RA, configured to send the obtained IP packet to the BR in the destination edge network for processing;
wherein the first RA maintains all routing information on the edge network and the TN while other routers in the TN only maintain routing information in the TN.

20. The device of claim 19, further comprising:
a registering unit, configured to register a mapping table between edge network route prefix information and border router information.

21. The device of claim 20, further comprising:
a synchronizing unit, configured to synchronize the registered mapping tables of the first RA and a second RA.

* * * * *